(12) United States Patent
Ohta

(10) Patent No.: US 6,897,978 B1
(45) Date of Patent: May 24, 2005

(54) IMAGE PROCESSING APPARATUS IMAGE PROCESSING METHOD AND RECORDING MEDIUM

(75) Inventor: Kenichi Ohta, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/363,028

(22) Filed: Jul. 29, 1999

(30) Foreign Application Priority Data

Jul. 30, 1998 (JP) .......................................... 10-215685

(51) Int. Cl.$^7$ ........................... H04N 1/58; H04N 1/047
(52) U.S. Cl. ....................... 358/1.9; 358/3.26; 358/504; 358/505
(58) Field of Search ................................ 358/504, 505, 358/530, 3.26, 1.9, 296, 3.05; 399/49, 172, 301, 38; 347/116

(56) References Cited

U.S. PATENT DOCUMENTS

| | | | | |
|---|---|---|---|---|
| 4,513,325 A | * | 4/1985 | Itoh | 358/450 |
| 5,185,673 A | * | 2/1993 | Sobol | 358/296 |
| 5,416,613 A | * | 5/1995 | Rolleston et al. | 358/518 |
| 5,546,165 A | * | 8/1996 | Rushing et al. | 399/78 |
| 5,565,678 A | * | 10/1996 | Manian | 250/252.1 |
| 5,566,372 A | * | 10/1996 | Ikeda et al. | 399/46 |
| 5,579,090 A | | 11/1996 | Sasanuma et al. | 355/208 |
| 5,583,644 A | | 12/1996 | Sasanuma et al. | 358/296 |
| 5,892,595 A | * | 4/1999 | Yamakawa et al. | 358/504 |
| 6,076,915 A | * | 6/2000 | Gast et al. | 347/19 |
| 6,081,343 A | * | 6/2000 | Terashita | 358/1.9 |
| 6,164,750 A | * | 12/2000 | Subirada et al. | 347/19 |
| 6,310,637 B1 | * | 10/2001 | Shimada et al. | 347/19 |
| 6,313,924 B2 | * | 11/2001 | Kanamori | 358/1.9 |
| 6,390,587 B1 | * | 5/2002 | Subirada | 347/19 |
| 6,416,151 B1 | * | 7/2002 | Otsuka et al. | 347/19 |
| 6,426,765 B1 | * | 7/2002 | Iwasaki et al. | 347/12 |
| 6,454,390 B1 | * | 9/2002 | Takahashi et al. | 347/41 |
| 6,462,838 B1 | * | 10/2002 | Hirata et al. | 358/3.05 |
| 6,473,200 B1 | * | 10/2002 | Ogata | 358/1.9 |
| 6,494,557 B1 | * | 12/2002 | Kato et al. | 347/19 |
| 6,654,493 B1 | * | 11/2003 | Hilliard et al. | 382/167 |
| 2003/0016263 A1 | * | 1/2003 | Takahashi et al. | 347/19 |

FOREIGN PATENT DOCUMENTS

JP   408321925 A   *   4/1995   ............ H04N/1/04

* cited by examiner

*Primary Examiner*—Scott A. Rogers
(74) *Attorney, Agent, or Firm*—Fitzpatrick, Cella, Harper & Scinto

(57) ABSTRACT

An image processing method is provided for instructing an image output unit to output onto a recording medium a reference image based on a predetermined patch pattern, and for generating an image output condition of the image output unit on the basis of read data of the reference image output by the image output unit. In the patch pattern, plural identical patches are disposed at different positions on the recording medium. Thus, it is possible to prevent an influence of reading error due to a position of an image reading unit and to generate the satisfactory image output condition on the basis of the reference image formed by the image output unit.

7 Claims, 13 Drawing Sheets

FIG. 2
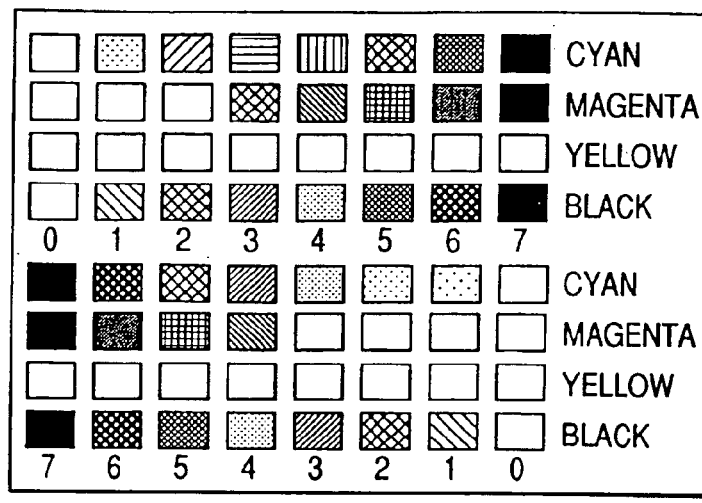
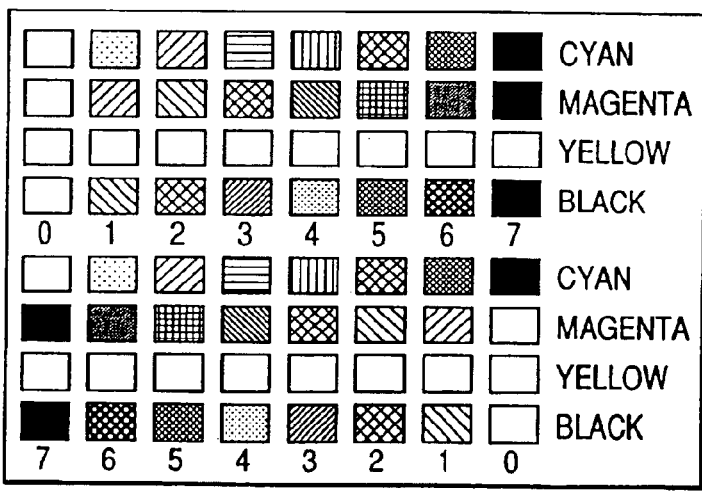
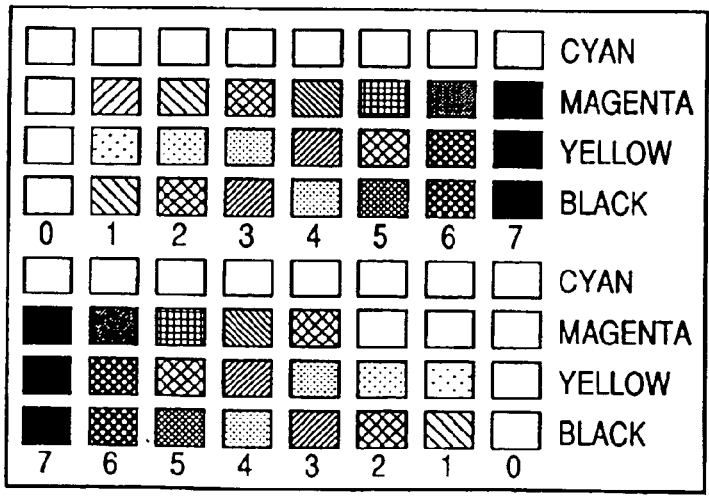

FIG. 13

```
┌─────────────────────────────────────────────┐
│  ┌─ PATCH PATTERN FORMATION CONDITION ─┐    │
│  │                                      │    │
│  │    ACCURACY    [HIGH      ▼]         │    │
│  │                                      │    │
│  │    KIND        [ORDINARY  ▼]         │    │
│  │                                      │    │
│  └──────────────────────────────────────┘    │
│                                    [OK]      │
└─────────────────────────────────────────────┘
```

IMAGE PROCESSING APPARATUS IMAGE PROCESSING METHOD AND RECORDING MEDIUM

BACKGROUND OF THE INVENTION

1. Field of the Invention

The present invention relates to an image processing method for forming an image output condition of an image output unit on the basis of read data of reference image output from the image output unit, an image processing apparatus for executing the above image processing method, and a recording medium for storing a program to realize the above image processing method.

2. Related Background Art

In recent years, various peripherals such as a personal computer, a printer and the like come into popular use, whereby everyone can easily output hard copies of a word processing document and a graphic document formed on the computer.

As a typical example of such a structure, a system as shown in FIG. 10 has been known.

That is, FIG. 10 shows the schematic structure of the system in which a page layout document, the word processing document, the graphic document and the like are formed based on DTP (desktop publishing) using a host computer 101, and the formed document is output as the hard copy by a laser beam printer, an ink jet printer or the like.

In FIG. 10, numeral 102 denotes an application which operates on the host computer 101. As the typical applications, word processing software such as "WORD" available from Microsoft and page layout software such as "PageMaker" available from Adobe are widely used.

A digital document formed by using such the software is transferred to a printer driver 103 through a not-shown OS (operating system) of the computer.

Ordinarily, the digital document is represented as gathering (or aggregate) of command data of figures, characters and the like constituting one page, and such the command data are transferred to the printer driver 103. A series of commands constituting a screen are represented in the language called as PDL (page description language). A GDI, a PostScript and the like are widely used as the typical PDL.

The printer driver 103 transfers the received PDL command to a rasterizer 105 in a raster image processor 104. The rasterizer 105 expands the character, the figure and the like represented based on the PDL command to a two-dimensional bit map image in order to actually print output the character, the figure and the like. In the bit map image, a two-dimensional plane is filled with repetition of one-dimensional rasters (i.e., lines). This is the reason why the unit to form the bit map image is called as the rasterizer. The expanded bit map image is temporarily stored in an image memory 106.

FIG. 11 schematically shows the above operation. That is, a document image 111 displayed on the host computer 101 is transferred as a PDL command queue 112 to the rasterizer 105 through the printer driver 103, and the rasterizer 105 expands a two-dimensional bit map image 113 onto the image memory 106.

The expanded image data is transferred to a color printer 107. Since the printer 107 contains an image formation unit 108 of known electrophotographic system or ink jet recording system, the printer 107 forms a visible image on a paper sheet by using the unit 108 and then print outputs the formed visible image. Of course, the image data in the image memory 106 is transferred in synchronism with a not-shown sync signal or clock signal necessary to operate the image formation unit 108, a transfer request of a specific color component signal and the like.

In the above-explained conventional example, it has been known that following various problems occur as to the image formation unit used for print output.

That is, if the identical original document is repeatedly read and output, a tint of the output image finally obtained from the identical document often varies every time the image is output due to unstableness of an output characteristic of the image formation unit and dispersion between the connected devices. Further, if the output image is printed by different printers, the result obtained by one printer is often different from that obtained by other printers.

The reason why such inconvenience occurs is as follows. For example, it is assumed that the image formation unit applies the electrophotographic system. In an electrophotographic process of this system, various processes such as laser exposure, latent image formation onto a photosensitive body, toner developing, toner transfer onto a paper medium, toner heat fixing and the like tend to be influenced by ambient temperature and humidity, a time change of the parts (i.e., deterioration due to time elapse), and the like. Thus, a toner quantity finally fixed onto the paper medium varies every time the electrophotographic process is executed.

It has been known that such unstableness is not characteristic or peculiar to the electrophotographic system, but arises also in the inkjet recording system, a heat-sensitive transfer system and other various systems.

In order to eliminate such inconvenience, a system as shown FIG. 12 has been conventionally thought. In this system, a test pattern image 121 is output from the color printer 107, and the density of the output pattern is measured to correct the characteristic of the image formation unit 108. Hereinafter, the operation at this time will be explained in due order.

Initially, the host computer 101 sends a command for outputting a predetermined gradation pattern, to the raster image processor 104 (step (11)). The processor 104 forms a bit map pattern for the print output on the basis of the given command, and then transfers the formed bit map pattern to the color printer 107 (step (12)). Then the printer 107 prints or outputs the given bit map pattern onto the paper medium (step (13)). In this case, as shown in FIG. 12, the output test pattern image 121 includes four kinds of color pattern groups (i.e., C (cyan) pattern group 122, M (magenta) pattern group 123, Y (yellow) pattern group 124 and K (black) pattern group 125) respectively corresponding to four-color toners of the printer 107. Further, each color pattern group further includes patterns of eight levels "0" to "7" respectively corresponding to toner adhesion area ratios 0% to 100%.

Namely, the output test pattern image 121 includes total 32 rectangle print areas or patches (four colors×eight levels) each corresponding to the above minimum color pattern. A reflection densitometer 126 measures the density of each patch (step (14)), and then transfers the measured density value of each patch to the host computer 101 (step (15)).

Then the host computer 101 compares the measured density value with a previously stored reference value to form a correction table for each of the C, M, Y and K pattern groups 122 to 125, and then registers the formed tables in a not-shown table conversion unit of the raster image processor 104 (step (16)). Although there is no explanation, the table conversion unit is the table which is used to correct the value to be written as the bit map data in the processor 104 in case of forming the bit map image.

For example, on the output test pattern image 121, if the density of the third patch (level 2) in the C pattern group 122 is measured and judged to be lower than the reference value, the bit map data corresponding to this third patch is corrected to have a higher value in the correction table, whereby it is possible to set the density characteristic of the printer 107 closing up to the reference value.

By the above procedure, it is possible to stabilize the output density characteristic of the printer 107. However, as shown in FIG. 12, the densitometer to measure the printer output patch is necessary if doing so. Generally, since such the densitometer is very expensive, only a small number of users can buy it for exclusively stabilizing the density.

Further, even if the densitometer can be used, since the numerous patches of the printer must be sequentially measured one by one, it is laborious and cumbersome for the user.

Further, it has been thought a system in which a simple image input apparatus called a flatbed scanner is used instead of the expensive densitometer, and the output patches of the printer are read by this scanner to measure the density of each patch. In this case, however, since reading accuracy of the scanner is insufficient, if the patch is put at a different position on the original support board of the scanner, the measured and obtained density value seriously varies.

SUMMARY OF THE INVENTION

The present invention has been made in consideration of the above-described conventional drawback, and an object thereof is to prevent an influence of reading error due to a position of an image reading unit and to be able to generate a satisfactory image output condition on the basis of a reference image formed by an image output unit.

In order to achieve the above object, the present invention has the following structure.

In the first invention, there is provided an image processing method for instructing an image output unit to output onto a recording medium a reference image based on a predetermined patch pattern, and generating an image output condition of the image output unit on the basis of read data of the reference image output by the image output unit, wherein in the patch pattern, plural identical patches are disposed at different positions on the recording medium.

In the second invention, there is provided an image processing method for instructing an image output unit to output onto a recording medium a reference image based on a predetermined patch pattern, and generating an image output condition of the image output unit on the basis of read data of the reference image output by the image output unit, wherein in the patch pattern, the number of patches of black is different from the number of patches of another color.

Other objects and features of the present invention will become apparent from the following detailed description and the attached drawings.

BRIEF DESCRIPTION OF THE DRAWINGS

FIG. 2 is a view for explaining read image data representing a gradation pattern;

FIG. 13 is a view showing an example of a user interface.

DETAILED DESCRIPTION OF PREFERRED EMBODIMENTS (First Embodiment)

Hereinafter, the first embodiment of the present invention will be explained.

Figure 1:
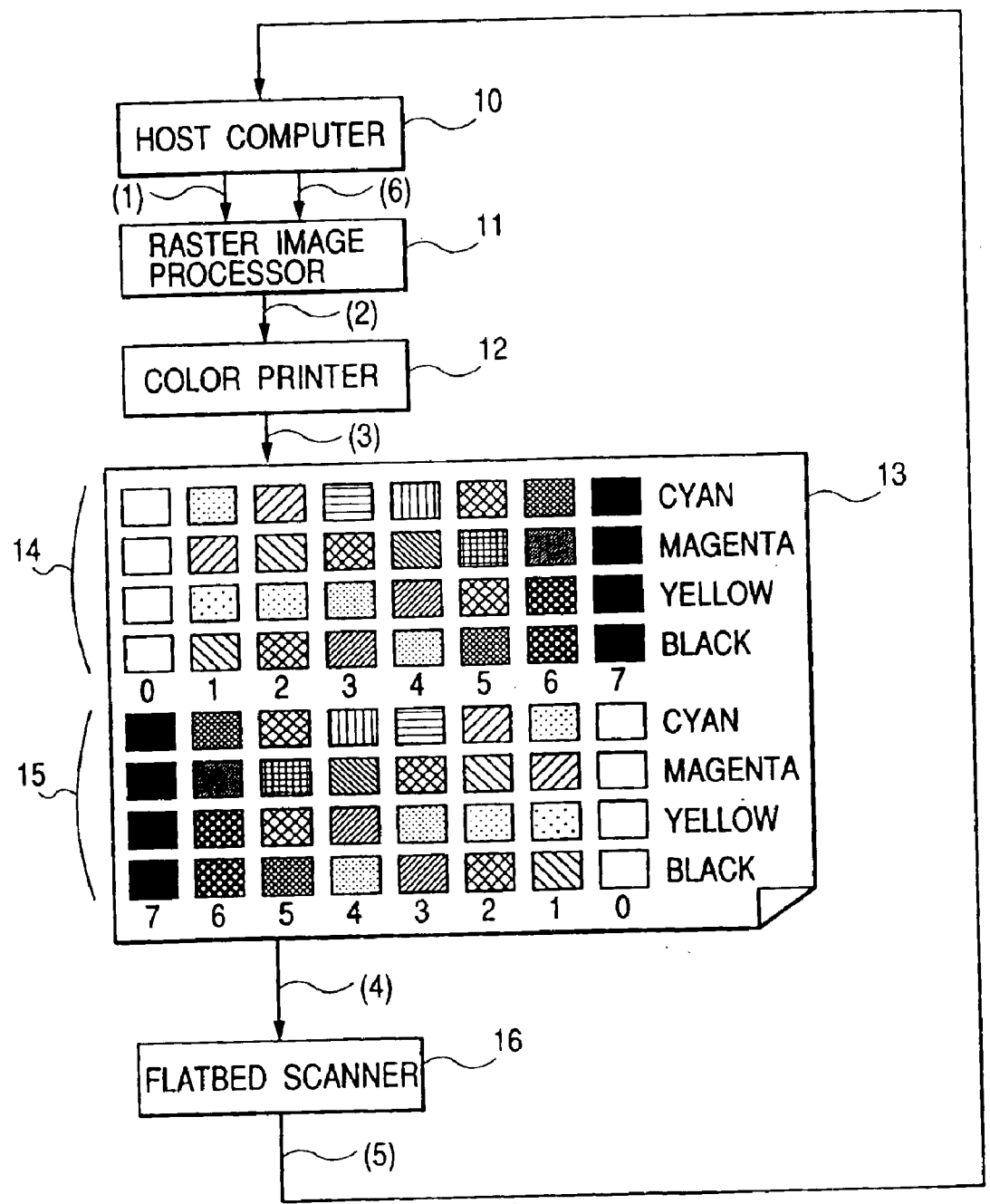
FIG. 1 is a view showing an example of a system structure according to the present invention.
Figure 10:
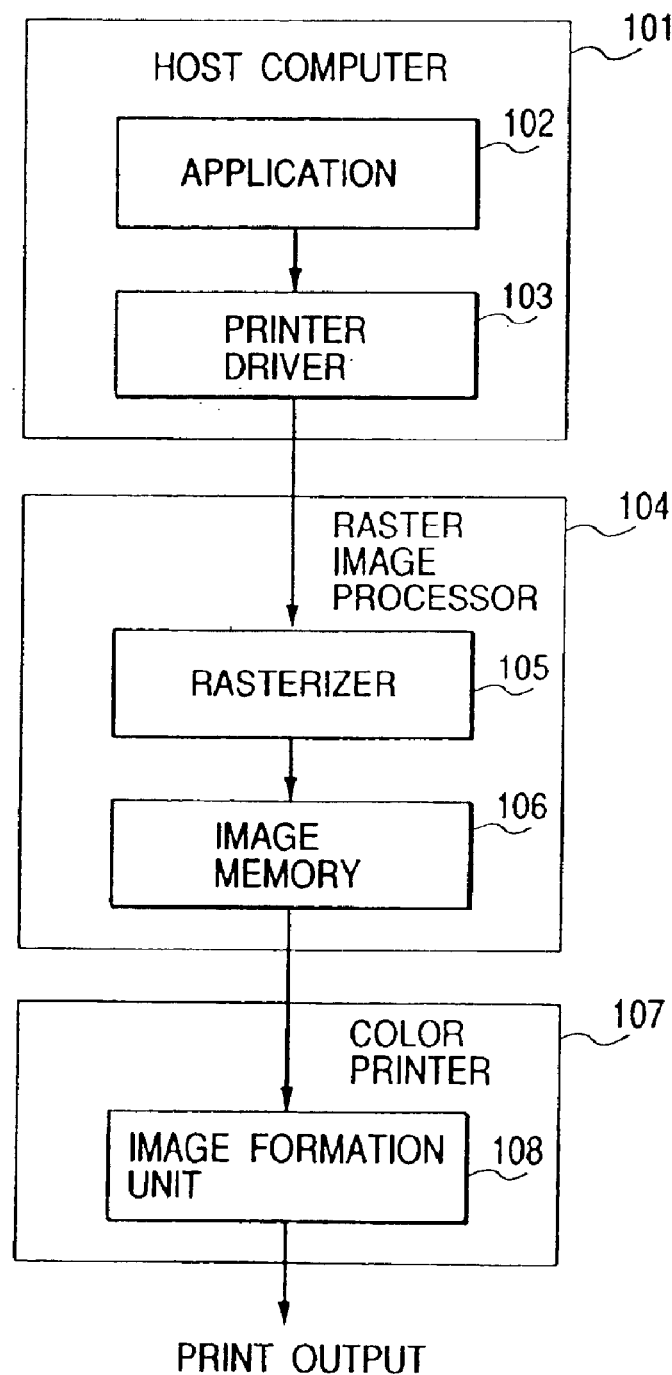
FIG. 10 is a view showing an example of an image processing system.
Figure 11:
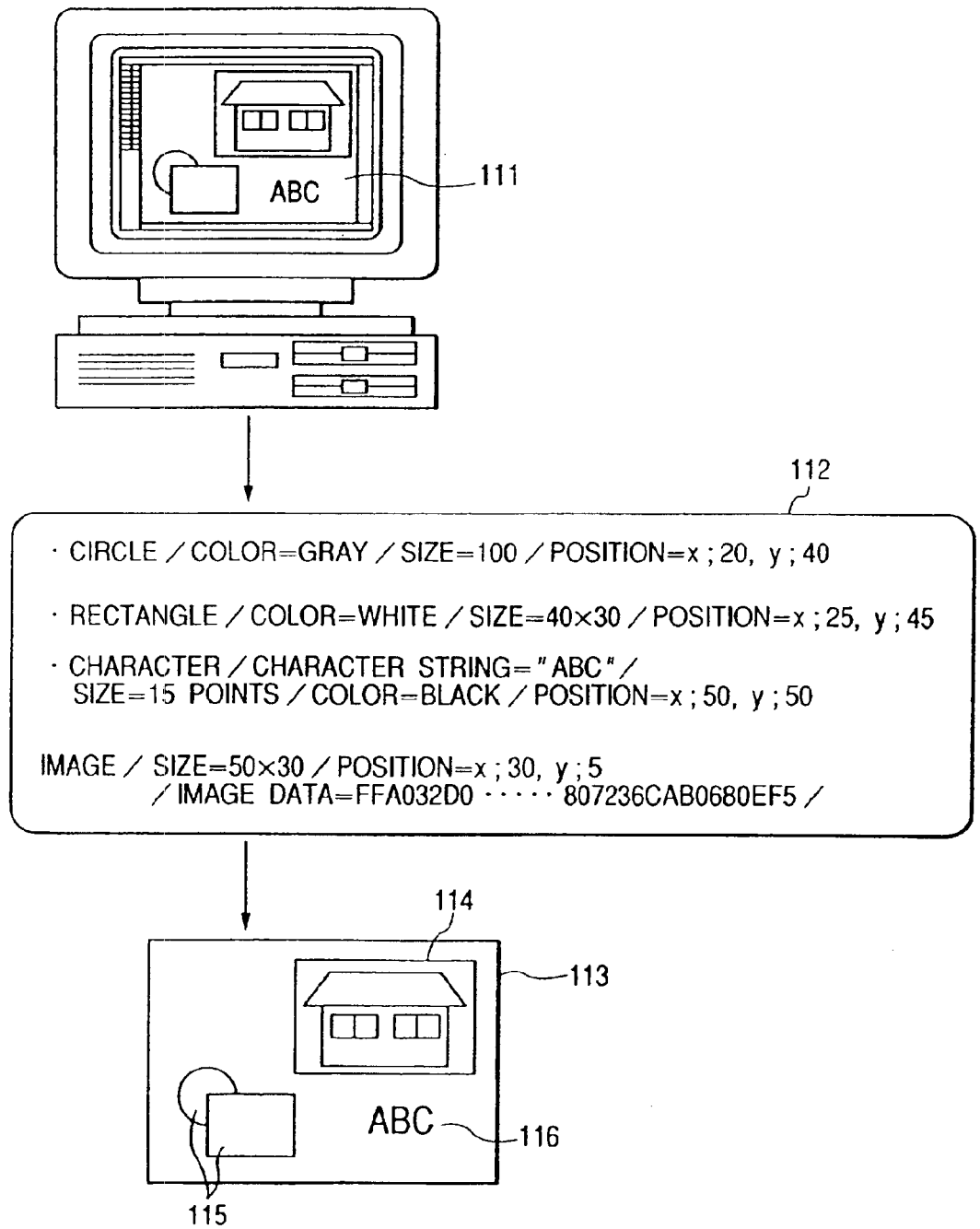
FIG. 11 is a view for explaining an ordinary operation of the image processing system.

FIG. 1 is a block diagram showing an example of an image processing system according to the first embodiment of the present invention. In FIG. 1, it should be noted that numerals 10, 11 and 12 respectively denote the components same as those denoted by the numerals 101, 104 and 107 in FIG. 10. Further, it should be noted that a procedure (steps (1) to (3)) to be performed until a gradation pattern from a host computer is printed or output is the same as the conventional procedure (step (11) to (13)) shown in FIG. 12.

Figure 12:
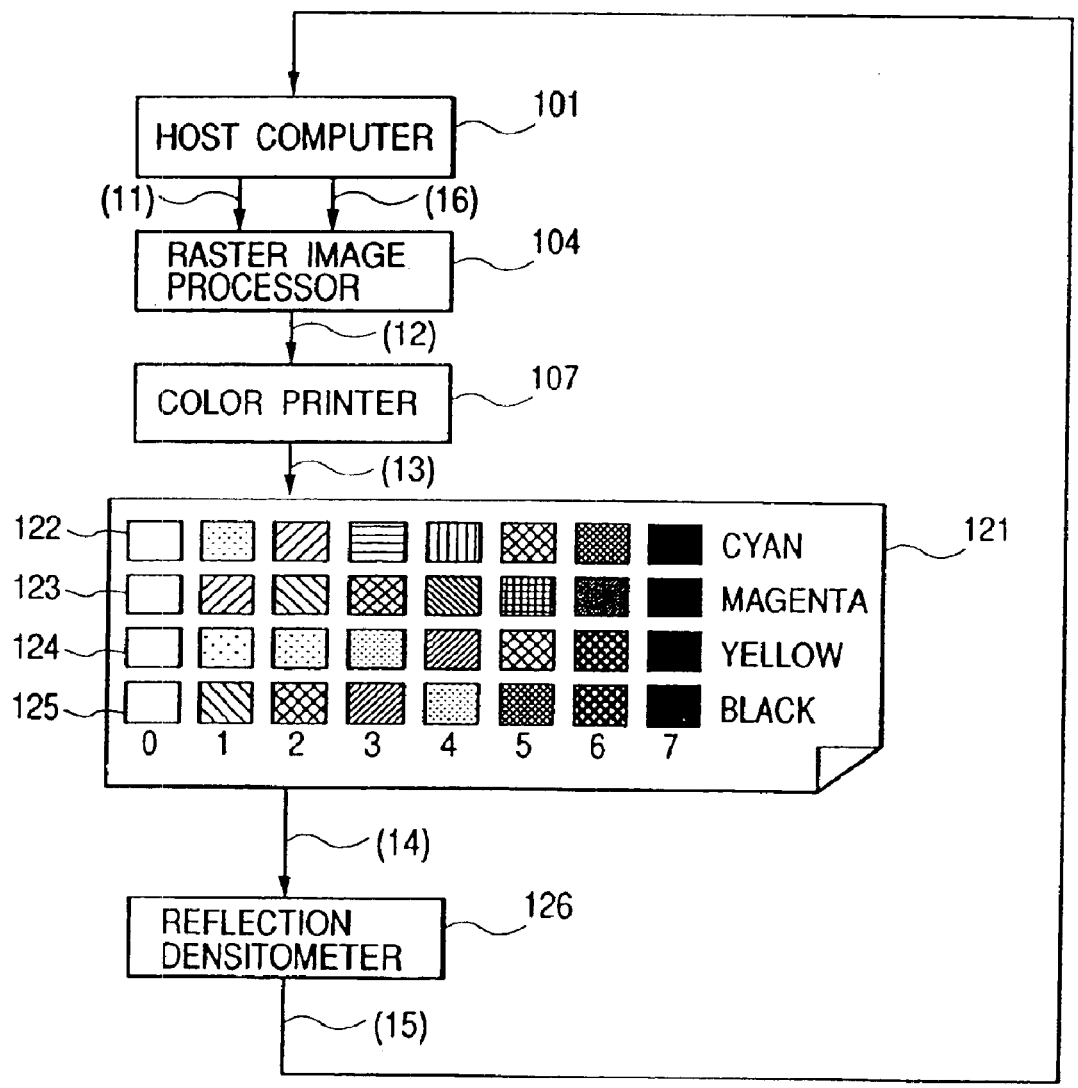
FIG. 12 is a view showing an example of a conventional image processing system.

However, a gradation pattern image 13 output in the present embodiment is different from the test pattern image 121 shown in FIG. 12. That is, an upper-half pattern 14 of the pattern image 13 is the same as the entire pattern image 121 including the C, M, Y and K pattern groups 122 to 125. In addition, the pattern image 13 further includes a lower-half pattern 15 which is symmetrical with the upper-half pattern 14.

The reason why the lower-half pattern 15 is provided in addition to the upper-half pattern 14 is to absorb unevenness in printer density and unevenness in scanner reading characteristic.

The output gradation pattern image 13 is put on an original support glass of a flatbed scanner 16 as it is, and image data of the entire pattern image 13 is read by the scanner 16 in response to a not-shown reading instruction from the host computer 10 (step (4)).

The read image data is transferred to the host computer 10 (step (5)). Then the computer 10 analyzes the image data to obtain a density value of each patch, forms a correction table based on the obtained density values, and registers the formed table in the raster image processor 11 (step (6)).

Hereinafter, the above procedure will be explained in more detail. In this case, although the procedure is performed by software on the host computer 10 with use of the read image data, operation and detailed controlling of the software on an OS (operating system) are omitted. That is, only the basic operation will be explained.

The image data obtained by reading an entire output paper sheet with use of the flatbed scanner 16 represents color-separated bit map images of R (red), G (green) and B (blue). These bit map images are transferred to the host computer 10. FIG. 2 schematically shows three plains of the bit map images (i.e., R plane 21, G plane 22 and B plane 23).

In FIG. 2, while a white rectangle represents a light (i.e., low density) area from which read signal value is large, a black rectangle represents a dark (i.e., high density) area from which signal value is small. As apparent from the drawing, in the R plane 21, the high density portions of cyan and black patches are correctly read as the high density areas. Similarly, magenta and black patches are correctly read in the G plane 22, and yellow and black patches are correctly read in the B plane 23.

Therefore, it can be understood that, the data of the R plane 21 can be used to measure the density of the C patch, the data of the G plane 22 can be used to measure the density of the M patch, and the data of the B plane 23 can be used to measure the density of the Y patch. Although any of the R, G and B planes may be used to measure the density of the K patch, it is assumed that the data of the G plane 22 is used in the present embodiment.

Hereinafter, a procedure of patch density measurement will be explained as a typical example.

Figure 3:
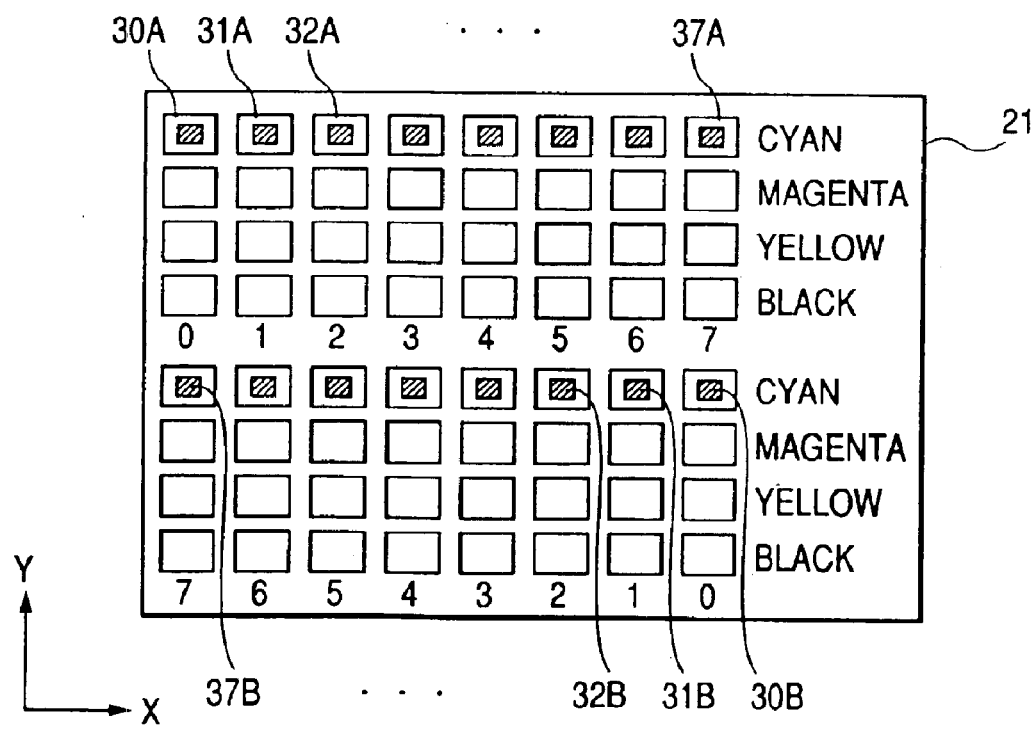
FIG. 3 is a view for explaining a gradation patch cut from the read data.

FIG. 3 shows image data read from the R plane 21. It should be noted that, although the R plane 21 in FIG. 3 is substantially the same as that in FIG. 2, the R plane 21 in FIG. 3 includes only rectangles merely representing respective patch positions and omits the lightness of each patch.

As shown in the drawing, the image data is composed of pixel values arranged in matrix on two-dimensional (i.e., x and y) coordinates, whereby position and size of each patch can be designated by x and y coordinate values. Further, since the x and y coordinates of each patch are determined based on a gradation patch output command from the host computer, it is possible to previously correlate the coordinate values with the patch output command and store the correlated values such that the stored coordinate values can be then read.

Subsequently, a procedure to obtain the density value on the basis of position coordinate information of the cyan patch will be explained hereinafter.

Initially, an image cutoff area 30A (inside of rectangle indicated by inclined lines) is determined from an upper patch line of cyan on the basis of the position coordinates of the leftmost lowest-density patch (gradation number "0"), and image data S(x, y) inside the rectangle is read. Since the image data S(x, y) is ordinarily represented as a digital signal of eight bits or so, the image data S will be explained as integer values "0" to "255".

Since the image data S(x, y) is composed of the image data within the area 30A, the total number of image data is determined according to the number of pixels included inside the rectangular area 30A. In a case where the number of pixels in the x direction of the rectangular area is set as Nx and the number of pixels in the y direction is set at Ny, the total number of image data included in the image data S(x, y) is obtained by Nx×Ny pixels.

Subsequently, an average value Sm of the pixel values within the area 30A is obtained by a following equation (1).

$$Sm = (\Sigma S(x, y))/(Nx \times Ny) \quad (1)$$

In the equation (1), the symbol Σ denotes the sum of the data within the rectangular area 30A. Since the obtained average value Sm is the average value of the pixel data of the patch (gradation number "0") in the upper patch line of cyan, such the value is assumed to be represented as average data Sc0A.

Subsequently, average data of the second patch (gradation number "1") in the upper patch line of cyan is obtained. Like the above, a rectangular area 31A is obtained based on the patch position coordinate information, and average data Sc1A (pixel data) is obtained in the same procedure.

Similarly, rectangular areas 32A, 33A, . . . , and 37A are sequentially obtained, and thus average data Sc2A, Sc3A, . . . , and Sc7A are obtained respectively.

After then, the average values of the patches in a lower patch line of cyan are obtained. Contrary to the upper patch line, a rectangular area 30B is obtained from a rightmost patch to obtain average data (pixel data). In the lower patch line, since the rightmost patch corresponds to a gradation number "0", the average value of the pixel data of the patch is assumed to be represented as average data Sc0B.

Similarly, rectangular areas 31B, 32B, . . . , and 37B are sequentially obtained, and thus average data Sc1B, Sc2B, . . . , and Sc7B are obtained respectively.

In this case, since each of the areas 30A and 30B, the areas 31A and 31B, . . . , and the areas 37A and 37B represents the patches by which the same gradation level is reproduced, the paired average data (values) must be essentially identical with each other if density variation due to printer output position and read value variation due to scanner reading position do not occur. That is, following equations must be essentially satisfied.

$$Sc0A = Sc0B \quad (2)$$
$$Sc1A = Sc1B$$
$$\vdots$$
$$Sc7A = Sc7B$$

However, in fact, these values are not always identical with each other due to various variation factors. Therefore, the present invention adopts a structure in which the average value of the paired data is considered as the true patch read value and such the true value is processed on the premise that the equations (2) are not always satisfied.

That is, values Sc0, Sc1, . . . , and Sc7 are considered as the true patch data, following equations (3) are given.

$$Sc0 = (Sc0A + Sc0B)/2 \quad (3)$$
$$Sc1 = (Sc1A + Sc1B)/2$$
$$\vdots$$
$$Sc7 = (Sc7A + Sc7B)/2$$

If an average image signal of each patch is obtained from the above equations (3), then the obtained signal is converted into the density value. Ordinarily, since the image data read by the scanner is a so-called luminance signal proportional to reflectance of an original document, an appropriate logarithmic conversion process is necessary to convert the read image data into the density value. As an example of a conversion equation to represent a density value D as an eight bit integer value, a following equation (4) is thinkable.

$$D = -255 \times \log 10(S/255)/2.0 \quad (4)$$

The equation (4) is to convert the luminance signal S into the density value D=255 when the original document density is 2.0. If the value D is larger than 255, the equation (4) limits the value D to 255.

By using the equation (4), the values Sc0, Sc1, . . . , and Sc7 obtained from the equation (3) are converted into values Dc0, Dc1, . . . , and Dc7, as follows.

$$Dc0 = -255 \times \log10(Sc0/255)/2.0 \quad (5)$$
$$Dc1 = -255 \times \log10(Sc1/255)/2.0$$
$$\vdots$$
$$Dc7 = -255 \times \log10(Sc7/255)/2.0$$

The density values of other color patches (magenta, yellow and black patches) can be obtained in the same manner. The density values obtained as above are assumed to be represented as density values Dm0 to Dm7, Dy0 to Dy7, and Dk0 to Dk7, respectively.

It should be noted that the density conversion equation is not limited to the equation (5). Namely, it is possible to use another conversion equation. Further, it is also possible to previously measure relation between the luminance signals and the density values and then use the measured relation as a look-up table for the density conversion.

Figure 4:
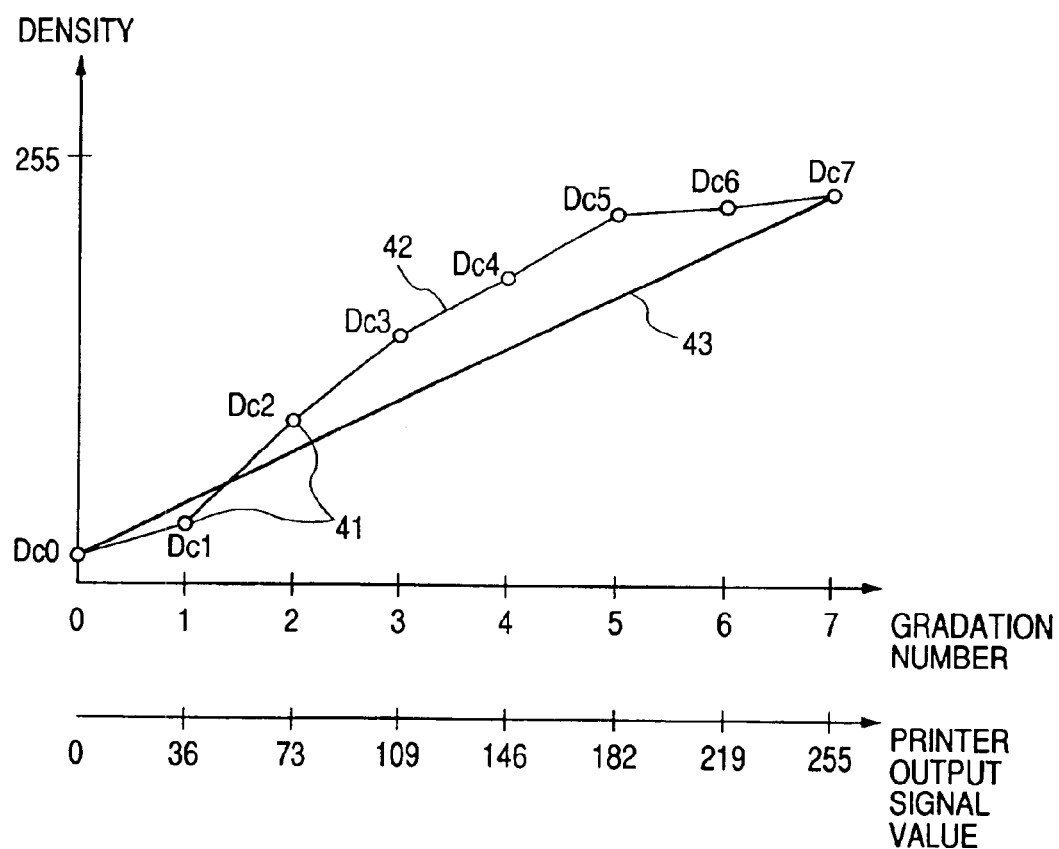
FIG. 4 is a view for explaining measured density characteristics.

FIG. 4 shows a graph in which the density values obtained for the cyan patch are plotted according to the patch gradation numbers. In FIG. 4, the horizontal axis represents the gradation numbers, the vertical axis represents the measured density values, white circles 41 represent respective measured values, and a polygonal curve (or line) 42 is composed of plural lines each connecting the adjacent measured values with each other.

The gradation numbers along the horizontal axis are obtained by sampling the signal values to be output to the printer (i.e., image formation unit) at a predetermined interval and adding appropriate numerals to the sampled values. The ordinary printer can output the image with eight-bit gradation for each of cyan, magenta, yellow and black, and forms and outputs onto a paper sheet the image having continuous gradation in accordance with the level of each signal value. Concretely, the printer outputs the image by a binarization process using a known dither process, a known error diffusion method or the like, and a modulation process for modulating a laser emission time to expose an electrophotographic photosensitive body.

In the present embodiment, the eight-bit signals "0" to "255" are segmented at an identical interval, and the patches "0" to "7" are output based on the obtained signal values. Therefore, the horizontal axis shown in FIG. 4 directly represents the signal values for the printer image formation.

That is, the gradation number "0" corresponds to the printer output signal value "0", the gradation number "1" corresponds to the printer output signal value "36", the gradation number "2" corresponds to the printer output signal value "73", the gradation number "3" corresponds to the printer output signal value "109", the gradation number "4" corresponds to the printer output signal value "146", the gradation number "5" corresponds to the printer output signal value "182", the gradation number "6" corresponds to the printer output signal value "219", and the gradation number "7" corresponds to the printer output signal value "255".

A fat line 43 in FIG. 4 represents an example of an ideal density characteristic to be given to the density value of the output patch with respect to the essential signal value output by the printer. That is, it is desirable for the printer to have the density characteristic proportional to the output signal value. However, due to variation of individual printer and environmental variation, the printer actually has the density characteristic 42 different from the ideal characteristic 43.

In this case, when the raster image processor rasterizes the PDL command to form the bit map images of the C, M, Y and K printer output signal values, it is possible for the processor to correct the C, M, Y and K values with use of a predetermined look-up table to generate the bit map data.

As the predetermined look-up table, it is possible to use a table having an inversive characteristic of the curve 42 of FIG. 4. On the basis of the measured density value, the host computer processes the C, M, Y and K data by using the conversion table having such the characteristic and then transfers the obtained data to the raster image processor.

Figure 5:
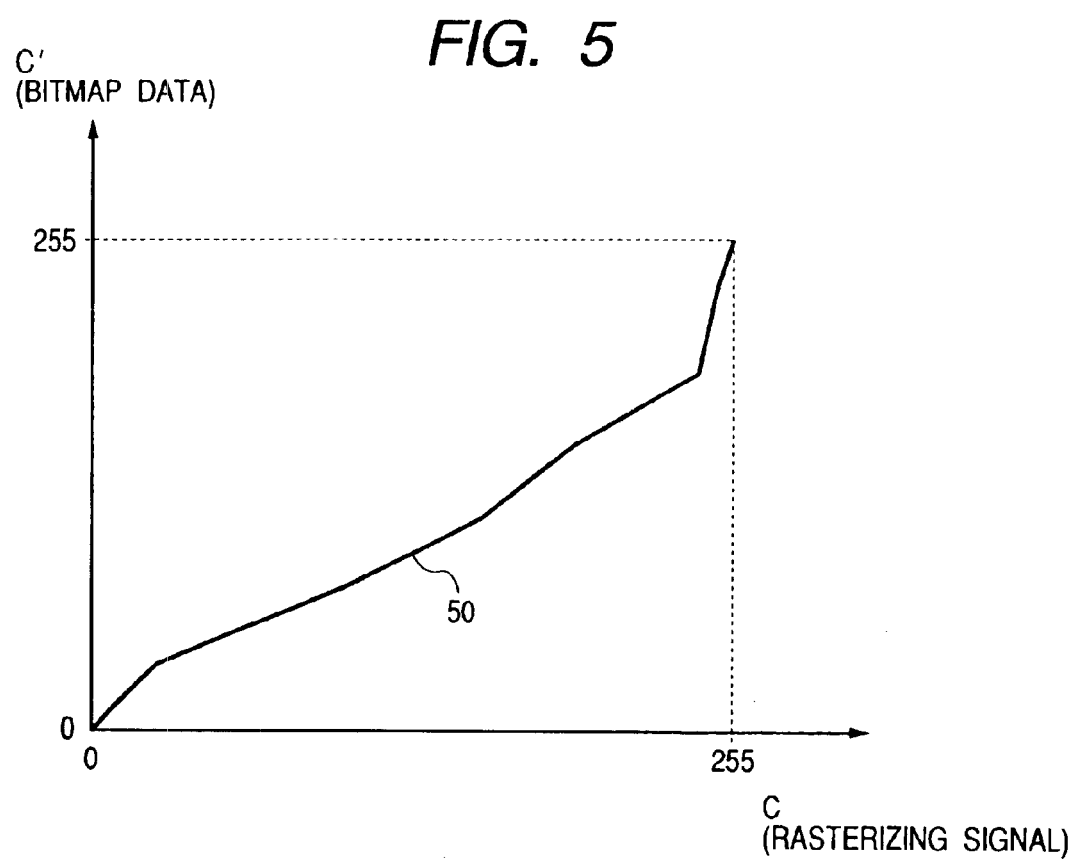
FIG. 5 is a view showing an example of a lookup table formed.

A fat line 50 shown in FIG. 5 represents an actual conversion table characteristic. As apparent from the drawings, the characteristic 50 is in inverse relation to the characteristic 42. That is, the characteristics 50 and 42 are symmetrical with respect to the line 43. By using this look-up table, the rasterizer converts the signal value C signal) posterior to the rasterizing into the signal value (C' signal) to be written into the bit map data.

If the image formation unit merely capable of performing only binary (i.e., ON and OFF) output is used, the C' signal is further subjected to a known pseudo-halftone process such as the dither process or the like and then written into the bit map memory.

By the procedure as explained above, it is possible to always stabilize the image output irrespective of the environmental variation and the dispersion between the connected devices. Further, since the plural patches of the identical gradation are disposed at the different positions for the density measurement patch pattern, it is possible to significantly improve density measurement accuracy, whereby it is further possible to realize higher output stability. For example, it is possible to eliminate an influence of reading error due to the position of an image reading unit.

Further, it is possible to stabilize the output characteristic of the image output apparatus with simple structure.

(Second Embodiment)

As the second embodiment, a modification of the first embodiment will be explained hereinafter.

Figure 6:
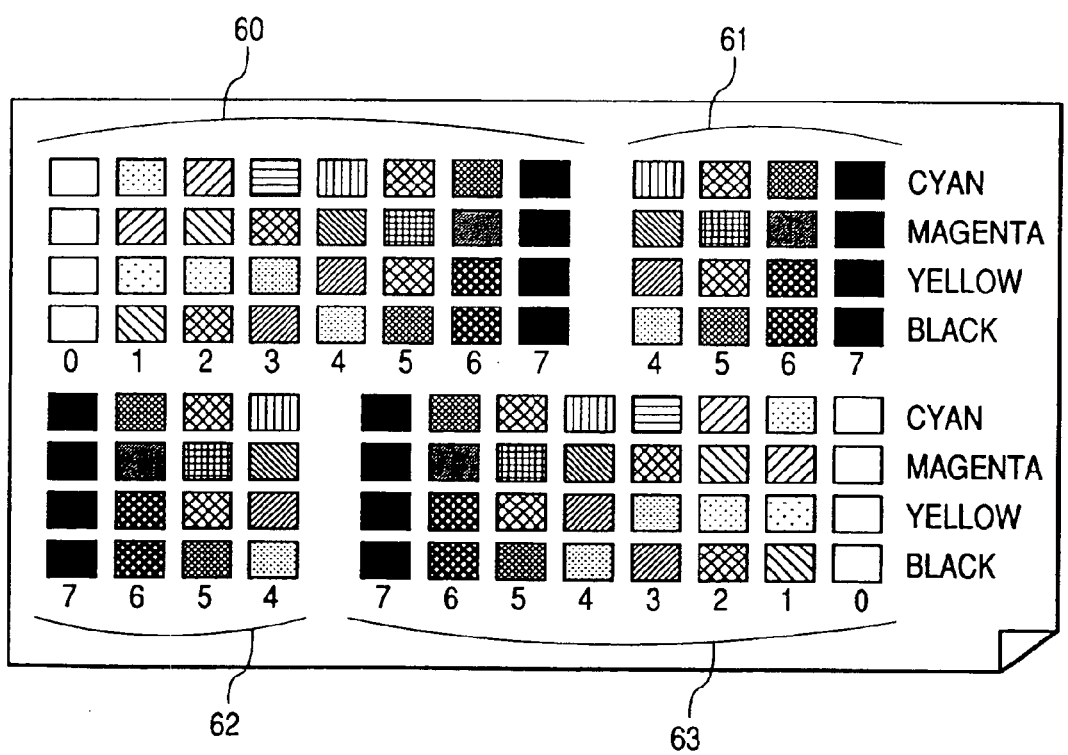
FIG. 6 is a view showing an example of a patch pattern.

FIG. 6 shows a pattern which is composed of four portions (i.e., patterns). In the drawing, a pattern 60 is identical with the pattern 14 of FIG. 1, and a pattern 63 is identical with the pattern 15 of FIG. 1. A pattern 61 corresponds to a higher-density four-gradation portion (i.e., right-half portion of pattern 60), and a pattern 62 also corresponds to a higher-density four-gradation portion (i.e., left-half portion of pattern 63).

In such a structure, two identical-gradation patches are disposed at the gradation numbers "0" to "3" (four gradations), and four identical-gradation patches are disposed at the gradation numbers "4" to "7" (four gradations).

Although the procedure to read this patch pattern to obtain the density value of each gradation is substantially the same as that in the first embodiment, only the following point in the present embodiment is different from the first embodiment. That is, each of the lower-density patches at the gradation numbers "0" to "3" is obtained as an average of the two patches, and each of the higher-density patches at the gradation numbers "4" to "7" us obtained as an average of the four patches.

Conventionally, there is a problem that, when a flatbed scanner reads a high-density original, reading accuracy degrades due to influence of a noise or the like. However, since the number of points from which the average is obtained is made larger by the above structure, it is possible to solve the above conventional problem.

Figure 7:
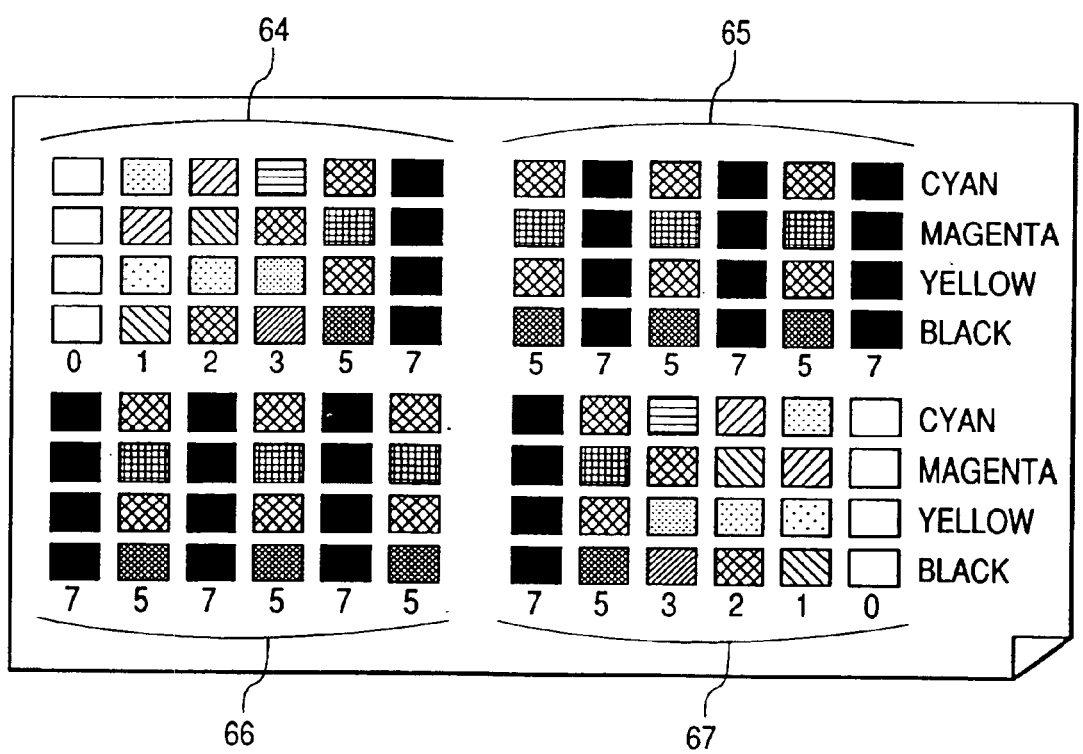
FIG. 7 is a view showing an example of the patch pattern.

FIG. 7 shows an example of a patch pattern in which the number of patches at the high-density portion is increased to improve accuracy by averageness.

In the drawing, a patch pattern 64 corresponds to the pattern 60 except for the patches at the gradation numbers "4" and "6", and a patch pattern 67 corresponds to the pattern 63 except for the patches at the gradation numbers "4" and "6". Each of patch patterns 65 and 66 is obtained by extracting the patches at the gradation numbers "5" and "7" and repeating them three times.

By doing so, it is possible to provide the two patch groups of the identical gradation at the gradation numbers "0" to "4" and the eight patch groups of the identical gradation at the gradation numbers "5" to "7", whereby it is possible to further improve reading accuracy by the averageness.

Also, in this case, since the number of patches at the higher-density portion is relatively large (i.e., eight), instead of the method in which the read values of these patches are simply averaged, it is possible to adopt a method in which the average of the six patches except for two patches of maximum and minimum reading luminance values is obtained.

Figure 9:
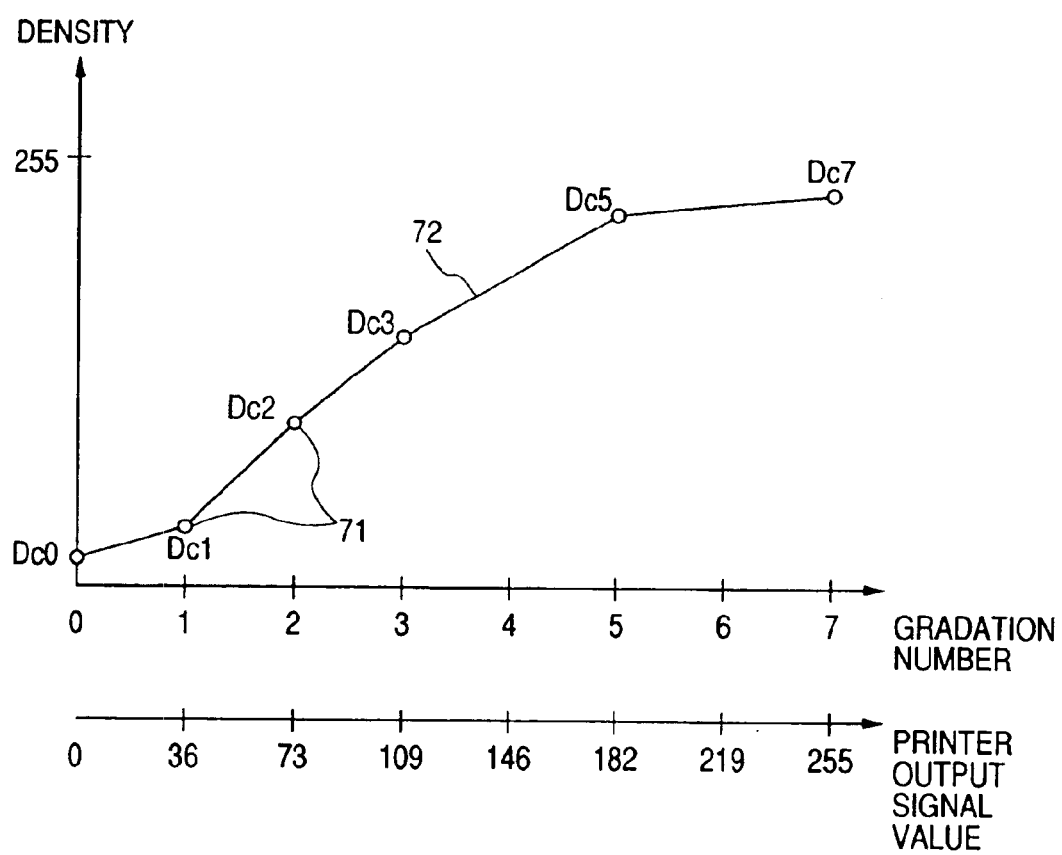
FIG. 9 is a view showing an example of measured density characteristics of the patch pattern shown in FIG. 7.

However, in this case, since the signal value interval between the adjacent gradations varies according to the density level, a measured density characteristic corresponding to that of FIG. 4 is as shown in FIG. 9. That is, from among measured points 71, the data at the points corresponding to the gradation numbers "4" and "6" can not be obtained, whereby resolution at the higher-density portion on a polygonal curve 72 slightly degrades.

Figure 8:
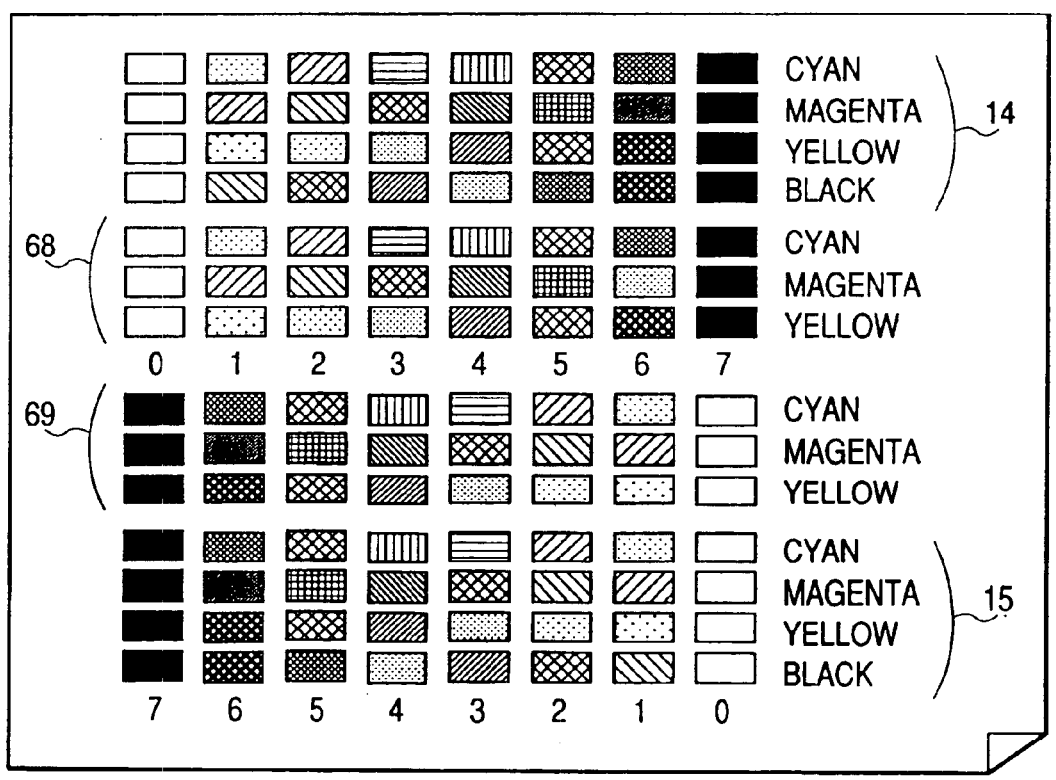
FIG. 8 is a view showing an example of the patch pattern.

FIG. 8 shows an example of still another patch pattern. This patch pattern includes two patch patterns 68 and 69 in addition to patterns equivalent to the patterns 14 and 15 of FIG. 1.

In the drawing, it should be noted that the patch pattern 68 corresponds to the pattern 14 except for the black patches, and the patch pattern 69 corresponds to the pattern 15 except for the black patches.

By such a structure, it is possible to provide the four patch groups of the identical gradation for each of cyan, magenta and yellow, and the two patch groups of the identical gradation for black. This is because, as explained in the first embodiment, the density characteristic of black can be measured by using any of the R, G and B plane data read with use of the flatbed scanner. Namely, if the density of black is obtained by using all the R, G and B plane data, the obtained density becomes substantially equal to the average of the patches at the six points (two points×3), whereby the two patch groups are sufficient for black.

On the other hand, merely one plane data is used for each of cyan, magenta and yellow. To compensate this, the four patch points are provided for each color to obtain the average of these four points.

In the above patch patterns shown in FIGS. 1, 6, 7 and 8, the plural identical-color and identical-gradation patches are not disposed in the identical vertical line of the drawings. This is to prevent that, for example, when density unevenness tends to occur in the vertical direction due to the structural problem of the image formation unit, such the density unevenness influences the identical-gradation patches, and thus the effect of averageness degrades.

Similarly, when density unevenness in the horizontal direction tends to occur, it is possible to prevent such inconvenience by not disposing the plural identical-gradation patches in the identical horizontal line of the drawings. Further, in order to eliminate the influence of the density unevenness in both the horizontal and vertical directions, it is preferable to dispose the identical-gradation patches in both the vertical and horizontal directions. It should be noted that the patch pattern shown in FIG. 1 has such an arrangement.

(Third Embodiment)

In the above-described first and second embodiments, the fixed patch pattern is used.

In the third embodiment, a test pattern is variable according to user's purpose, whereby it is possible to realize color reproduction according to the user's purpose.

In the present embodiment, a user's instruction concerning a patch pattern formation condition is input by using a user interface shown in FIG. 13 which is displayed on the host computer 101. Then a command representing a test pattern based on the user's instruction is transferred to the raster image processor.

In the user interface shown in FIG. 13, it is possible to set two conditions, i.e., an accuracy condition and a kind condition.

As apparent from the explanation of FIG. 1, the high-accurate correction table can be formed by increasing the number of formed patches. However, since the number of patches capable of being formed on one recording medium is limited, if the number of patches is increased, it is necessary to form these patches on the plural recording media. It is long time to form and read a test pattern on the plural recording media. Therefore, in the present embodiment, it is possible to set the accuracy, i.e., the number of recording media onto which the test pattern is formed, in accordance with the user's purpose. That is, it is possible in the present embodiment to set two kinds of accuracy ("high" accuracy and "ordinary" accuracy). If the "high" accuracy is set, the test pattern is formed by using two recording media. On the other hand, if the "ordinary" accuracy is set, the test pattern is formed by using one recording medium.

Further, since the number of patches capable of being formed is limited, it is difficult to form high-accurate correction data for the entire gradation. In the above-described embodiments, the plural test patterns respectively having different points emphasized by a user have been explained (FIGS. 1, 2, 6, 7 and 8). On the other hand, in the present embodiment, the kind of user interfaces is selectable in the user interface to be able to form the test pattern according to the point emphasized by the user. That is, it is possible in the present embodiment to select four kinds of test patterns ("ordinary" pattern, "highlight" pattern, "halftone" pattern and "dark" pattern). As shown in the test pattern 13 in FIG. 1, in the "ordinary" test pattern, the pattern is equally formed for each gradation. On the other hand, in the "highlight", "halftone" and "dark" test patterns, the number of patches for the selected gradation is made larger than the number of patches for other gradations.

It should be noted that the test pattern is formed according to a combination of the selected accuracy and kind.

As above, according to the present embodiment, it is possible to form the test pattern according to the user's purpose. Especially, by selecting the kind, it is possible to improve color reproduction accuracy at the gradation emphasized by the user.

Further, it is possible to select as the kind the color (cyan, magenta, yellow and black) to be emphasized.

(Other Embodiments)

The above-described embodiments have been explained on the premise that the printer is distant from the scanner. However, the present invention can adopt such a structure as a color copying machine in which printer and scanner units are unified.

Further, it has been explained in the above embodiments that the image formation unit performs the print output in response to the instruction from the host computer or the raster image processor. However, of course, the present invention can adopt such a structure as a copying machine in which a read signal from a scanner unit is output under the control of a CPU of the body of the copying machine itself.

Further, although the printer using four (C, M, Y and K) coloring agents has been explained, the present invention can adopt a printer unit using three (C, M and Y) coloring agents, or a printer using only a black coloring agent.

The present invention can be applied to a system composed of plural devices (e.g., host computer, interface equipment, reader, printer and the like), or to an apparatus comprising a single device (e.g., copying machine, fax machine or the like).

Further, the object of the present invention can be achieved in a case where a storage medium recording therein program codes of software for realizing the functions of the above embodiments is supplied to the system or the apparatus, and thus a computer (including CPU or MPU) of the system or the apparatus reads and executes the program codes stored in the storage medium. In this case, the program codes themselves read from the storage medium realize the functions of the above embodiments, whereby the storage medium storing therein the program codes constitutes the present invention.

As the storage medium for storing the program codes, for example, a floppy disk, a hard disk, an optical disk, a magnetooptical disk, a CD-ROM, a magnetic tape, a non-volatile memory card, a ROM and the like can be used.

Further, needless to say, the present invention includes not only a case where the computer executes the supplied program codes to realize the functions of the above embodiments, but also a case where an OS (operating system) running on the computer cooperates with the program codes or another application software to realize the functions of the above embodiments.

Further, needless to say, the present invention also includes a case where, after the supplied program codes are written into a memory provided in a function expansion board inserted in the computer or a function expansion unit connected to the computer, a CPU or the like provided in the function expansion board or the function expansion unit performs a part or all of the actual processes on the basis of the instructions of the program codes and thus the functions of the above embodiments are realized by such the processes.

Although the present invention has been explained by using the several preferred embodiments, the present invention is not limited to the structures of these embodiments. That is, various modifications and changes are possible in the present invention without departing from the spirit and scope of the annexed claims.

What is claimed is:

1. An image processing method for instructing an image output unit to output onto a recording medium a reference image based on a predetermined patch pattern, and generating an image output condition of the image output unit on the basis of data read from the reference image output by the image output unit using a flatbed scanner, wherein, in the patch pattern, plural identical patches of the reference image are disposed at different positions on the recording medium, including at different positions in a main-scan direction and in a sub-scan direction, wherein the image output condition is generated using the plural identical patches disposed at different positions on the recording medium in the main-scan direction and in the sub-scan direction, and wherein an influence of noise in the reading by the flatbed scanner is reduced by using the plural identical patches for generating the image output condition.

2. A method according to claim 1, wherein an average is obtained of the data concerning the plural identical patches read from the reference image.

3. A method according to claim 1, wherein the number of patches varies according to a color of the patches.

4. A method according to claim 1, wherein a patch's characteristics vary according to an image output unit signal.

5. A method according to claim 1, wherein the number of patches at a high density portion of the reference image is larger than the number of patches at a low density portion of the reference image.

6. An image processing apparatus which comprises:

instruction means for instructing an image output unit to output onto a recording medium a reference image based on a predetermined patch pattern; and generation means for generating an image output condition of the image output unit on the basis of read data obtained by reading the reference image output from the image output unit using a flatbed scanner, wherein, in the patch pattern, plural identical patches of the reference image are disposed, by said image output unit, at different positions on the recording medium, including at different positions in a main-scan direction and in a sub-scan direction, wherein the image output condition is generated by said generating means using the plural identical patches disposed at different positions on the recording medium in the main-scan direction and in the sub-scan direction, and wherein an influence of noise in the reading by the flatbed scanner is reduced by using the plural identical patches for generating the image output condition.

7. A recording medium recording a program to execute an image processing method, said program comprising:

code for instructing an image output unit to output a reference image based on a patch pattern; and code for generating an image output condition of the image output unit on the basis of data read from the reference image output by the image output unit using a flatbed scanner, wherein, in the patch pattern, plural identical patches of the reference image are instructed by said instructing code to be disposed at different positions on the recording medium, including at the different positions in a main-scan direction and a sub-scan direction, wherein the image output condition is generated by said generating code using the plural identical patches disposed at different positions on the recording medium in the main-scan direction and in the sub-scan direction, and wherein an influence of noise in the reading by the flatbed scanner is reduced by using the plural identical patches for generating the image output condition.

* * * * *

UNITED STATES PATENT AND TRADEMARK OFFICE
CERTIFICATE OF CORRECTION

PATENT NO. : 6,897,978 B1
DATED : May 24, 2005
INVENTOR(S) : Kenichi Ohta

It is certified that error appears in the above-identified patent and that said Letters Patent is hereby corrected as shown below:

<u>Title page, Item [54] and Column 1, lines 1-3,</u>
Title, "IMAGE PROCESSING APPARATUS IMAGE PROCESSING METHOD AND RECORDING MEDIUM" should read -- IMAGE PROCESSING APPARATUS, IMAGE PROCESSING METHOD AND RECORDING MEDIUM --.

Signed and Sealed this

Twenty-first Day of March, 2006

JON W. DUDAS
*Director of the United States Patent and Trademark Office*